United States Patent Office 2,901,496
Patented Aug. 25, 1959

2,901,496

SALICYLATE PROCESS FOR THORIUM SEPARATION FROM RARE EARTHS

George A. Cowan, Los Alamos, N. Mex., assignor to the United States of America as represented by the United States Atomic Energy Commission No Drawing. Application September 9, 1949
Serial No. 114,901

4 Claims. (Cl. 260—429.1)

This invention relates to compounds of thorium and to a process for the preparation of compounds of thorium. The present invention also relates to a process for the separation of thorium from aqueous solutions, especially solutions containing rare earths as well as thorium.

Natural-occurring thorium such as that found in monazite sands is usually associated with members of the rare earth series. It is therefore an object of this invention to provide a method for the separation of natural-occurring thorium from the rare earth elements with which it is commonly associated in monazite sands.

Conversely it is a further object of this invention to provide thorium-free heavy metals such as thorium-free mixtures of rare earth metals.

It is a further object of this invention to provide a method whereby thorium can be freed of any rare earth fission products which are commonly associated with thorium in mixtures of rare earth fission products and other metals resulting from the capture of neutrons by thorium present in a neutronic reactor, wherein the source of power employed is uranium or a fissionable isotope of uranium such as $U^{233}$, $U^{235}$ or fissionable $Pu^{239}$. In neutronic reactors which employ the aforementioned uranium isotopes or plutonium as the power source, thorium is placed adjacent to the active fissionable isotope to serve as a means for capture of excess neutrons formed during a chain reaction. The capture of neutrons by the so-called "thorium blanket" gives rise to the formation of $Th^{233}$ which isotope decays to $Pa^{233}$ which in turn decays to $U^{233}$, the latter isotope constituting a further additional source of fuel for a neutronic reactor.

During such chain reaction involving fission of uranium, various rare earth fission products are formed as a result of the neutron bombardment of uranium and thorium. In order to recover the $U^{233}$ resulting from neutron bombardment of thorium and the accompanying decay of isotopes as described in the preceding paragraph, it is necessary to remove any residual thorium as well as rare earth fission products from the isotope mixture which is formed by the neutronic reaction. The present invention provides a method for the isolation of thorium from rare earth mixtures either prior to or subsequent to exposure of said thorium within a neutronic reactor.

It is a further object of this invention to provide a new series of compounds of thorium as well as a process for the preparation of said new compositions of matter which are conveniently separable from their mixtures with the rare earth elements including rare earth fission products.

Other objects and advantages of the present invention are apparent upon further examination of the following disclosure of this invention.

I have discovered that thorium can be isolated from an aqueous solution containing a thorium salt and buffered sufficiently to provide a pH of at least as high as 2, by contacting said solution with a salicylate i.e., a salicyclic acid and an alkali salt thereof. The compound formed by contact of the salicylate with the solution having a pH at least as high as 2 is the product of the reaction between the soluble thorium salt and the salicylate.

When the salicylate is 2-hydroxybenzoate, the new compound formed is thorium 2-hydroxybenzoate which has a reddish-orange color. Examples of other suitable salicylates which are used to form similar compounds of thorium are the various alkyl, aryl, nitro and halogen substituted derivatives of 2-hydroxybenzoic acid and alkali salts thereof, wherein the hydrogen atoms in the 3, 4, 5 and 6 positions are substituted. Examples of such substituted salicyclic acid compounds from which thorium compounds can be prepared are as follows:

2-hydroxy-3-methoxybenzoic acid
2-hydroxy-5-methylbenzoic acid
2,3-dihydroxy-6-phenylbenzoic acid
2-hydroxy-3-nitrobenzoic acid
2-hydroxy-3-bromobenzoic acid
2-hydroxy-5-chlorobenzoic acid
2-hydroxy-3-chlorobenzoic acid
2-hydroxy-3,5-dichlorobenzoic acid
2-hydroxy-3-chloro-5-tert-butylbenzoic acid
2-hydroxy-3-bromo-5-tert-butylbenzoic acid
2-hydroxy-3-isopropyl-5-chloro-6-methylbenzoic acid
2-hydroxy-3,5-dimethylbenzoic acid
2-hydroxy-3-chloro-4-tert-butylbenzoic acid
2-hydroxy-5-tert-butylbenzoic acid
2-hydroxy-5-chloro-6-methylbenzoic acid
2-hydroxy-5-tert-amylbenzoic acid
2-hydroxy-3-methyl-5-tert-butylbenzoic acid The thorium compounds prepared from the aforementioned salicylates can be isolated from aqueous solutions containing thorium even in sub-microgram amounts by the process of a further embodiment of this invention.

Thorium salicylates are readily soluble in substantially water-immiscible organic solvent compounds which are liquid at the temperature for extraction of thorium salicylate from aqueous solutions. The types of organic solvents suitable for the extraction of thorium salicylates are ethers, glycol ethers, esters, ketones, alcohols, and halogenated hydrocarbons. Specific examples of these types are ethyl ether, isopropyl ether, diethyl ether of ethylene glycol (diethyl "Cellosolve"), dibutyl ether of tetraethylene glycol, ethyl acetate, n-propyl acetate, isopropylacetate, isoamyl acetate, n-amyl acetate, methyl isobutyl ketone (hexone), tert-amyl alcohol, chloroform, and carbon tetrachloride. The preferred solvents for maximum extraction of thorium salicylates from aqueous solution are solvent mixtures such as ethyl acetate mixed with either ethyl ether or chloroform.

In accordance with a further and principal embodiment of this invention thorium is isolated from aqueous solutions containing other elements in addition to thorium such as the rare earth elements. D. M. Yost, H. Russell, Jr. and C. S. Garner in The Rare Earth Elements and their Compounds, Wiley and Sons, Inc., New York 1947, have classified rare earths as those belonging to the cerium group which includes lanthanum, cerium, praseodymium, neodymium, samarium, europium and the yttrium group, which includes yttrium, gadolinium, terbium, hafnium, dysprosium, thulium, lutecium and holmium. Separation of thorium from aqueous solutions containing a thorium salt and any or all of the above-mentioned elements in the cerium and yttrium groups is effected at pH at least as high as 2 by contacting a salicylate therewith, thereby forming a thorium salicylate, which compound is selectively extracted and removed from the other elements present in said aqueous solution by contacting with substantially water-immiscible organic solvents previously listed, which solvents preferentially or selectively extract thorium salicylate.

In accordance with the principal embodiments of this invention, the aqueous solution containing thorium as a soluble thorium salt dissolved therein is buffered sufficiently to effect a pH of between 2 and 5 and the buffered solution is contacted with a salicylate such as an ammonium salicylate. The aqueous solution is preferably buffered with an acetate buffer composed of ammonium acetate and acetic acid. The resultant thorium salicylate is separable from the aqueous solution either by precipitation, if the thorium is present in sufficient quantity, or preferably, by extraction from said aqueous solution by contacting the appropriately buffered aqueous solution containing thorium salicylate with a substantially water-immiscible organic solvent.

The pH for quantitative extraction of thorium as a thorium salicylate from aqueous solutions is a pH of about 3. The thorium salicylate, which is extracted from aqueous solutions into the water-immiscible organic solvent, can be subsequently recovered from the solvent phase by contacting the solvent phase with an aqueous solution containing sufficient inorganic acid to effect a pH of substantially less than 2 and thereafter separating the organic solvent phase from the aqueous extract phase which now contains a thorium salt. The thorium values are therefore recoverable from either the organic solvent phase or from an aqueous phase obtained by the process of this embodiment of this invention. The metal values are stripped from the organic solvent phase into a second aqueous phase and recovered from either phase by the usual conventional means which may include distillation and/or evaporation of the liquid phase containing the thorium values which are present as a salicylate in the case of the organic solvent phase.

The following examples will further illustrate the process of this invention.

Example I

Five ml. of acetate buffer solution containing 10% ammonium acetate and 10% acetic acid and 15 ml. of 5% ammonium salicylate (2-hydroxybenzoate) were added to 1-ml. aliquot portion of thorium nitrate solution containing about 0.1 g. of thorium nitrate. The resultant mixture containing thorium salicylate was contacted in a separatory funnel with 10 ml. of a mixture of 90% ethyl acetate and 10% ethyl ether. The aqueous phase was withdrawn into a second separatory funnel, 2 ml. of the ammonium salicylate solution was added, and the mixture was contacted with 5 ml. of the ethyl acetate-ethyl ether solvent mixture. The solvent extracts were combined and washed with 10 ml. of a solution containing 8 ml. of water, 2 ml. of buffer solution, and 2 ml. of the 5% salicylate solution. The aqueous portions contained the rare earths as well as most of the other impurities originally associated with the thorium, while the thorium free of rare earths was contained in the combined solvent portions. The following data show the efficiency of the thorium extraction by the organic solvent mixture. Sample 1 contained no rare earths in the thorium used, while in samples 2 and 3 a macro amount of praseodymium had been added. Sample 3 contained 0.0558 g. of praseodymium nitrate calculated as $Pr_2O_3$.

| Sample | $ThO_2$ Used, g. | Th Extracted, Percent |
| --- | --- | --- |
| 1 | 0.1133 | 99.6 |
| 2 | 0.1133 | 100.2 |
| 3 | 0.1133 | 100.9 |

Example II

A series of experiments was performed in which 5 ml. of a buffer solution containing 10% ammonium acetate and 10% acetic acid, and 5 ml. of a 20% ammonium salicylate solution were added to thorium nitrate containing 0.1 g. of thorium and 1 ml. of a solution of a tracer quantity of $Th^{234}$—$Pa^{234}$ ($UX_1$—$UX_2$) mixture as nitrates to provide radioactivity of about 30,000 counts/min. In some experiments 1 ml. of tracer solution containing about 1 microgram of radioactive cerium as nitrate or of radioactive yttrium as nitrate was used. The solution in a separatory funnel was then shaken in contact with 5 ml. of a mixture of 65% chloroform and 35% ethyl acetate to extract the thorium salicylate. In some experiments approximately 10 drops of concentrated nitric acid were added to the buffered solution before contact with the organic solvent.

In some experiments successive extractions were effected by addition of 5 ml. of a 20% by weight ammonium salicylate solution, 7 to 10 drops of concentrated nitric acid to the aqueous solution and contacting with 5 ml. of the organic solvent mixture.

In all experiments, a final extraction was made by adding several drops of concentrated nitric acid to the aqueous solution and then contacting with 5 ml. of the solvent mixture. All solvent extract portions were collected in a second separatory funnel and shaken with a wash solution containing 3 ml. of the ammonium salicylate solution, 3 ml. of the buffer solution and 5 drops of concentrated nitric acid. Five drops of concentrated nitric acid were added to the resultant wash solution and the solution was contacted with 5 ml. of organic solvent which was then added to the combined solvent extracts. The initial aqueous phase and aqueous wash solutions were then combined. The aqueous phases were analyzed for radioactive thorium, yttrium, and cerium by diluting to 25 ml. and evaporating a 1-ml. aliquot on a watch-glass for counting. In the case of yttrium and cerium, a comparison of the resultant counts was made with a similarly treated standard, correction being made for associated thorium activity. The analytical data are shown in the following table:

| Extraction Steps | Percent Th Extracted | Percent Y in Aqueous Phase | Percent Ce in Aqueous Phase |
| --- | --- | --- | --- |
| One extraction step, one final wash, no nitric acid used | 97 | | |
| Two extraction steps, one final wash, no nitric acid used | 98.4 | 88.4 | |
| Three extraction steps, one final wash, no nitric acid used | 99.4 | 84.5 | |
| Three extraction steps, one final wash, one solvent wash, no nitric acid used | 99 | 95 | 97 |
| Two extraction steps, one final wash, nitric acid added to extraction steps | 99.7 | | |
| Three extraction steps, one final wash, nitric acid added to extraction steps | 99.9 | 79 | |
| Three extraction steps, one final wash, one solvent wash, nitric acid added | 99.7 | 91.4 | |

In a similar experiment using a buffered thorium nitrate solution containing 0.5 g. of thorium, with three extraction steps, one final wash, and nitric acid added, 99.7% of the thorium was extracted and 79% of yttrium was found in the aqueous phase.

Example III

There was 77.5% thorium as thorium salicylate recovered by extraction with the organic solvent mixture of Example II from a solution containing 0.1 g. of thorium as the nitrate, buffered to a pH of 2.5 by adding 4 ml. of the buffer solution plus 2 ml. of glacial acetic acid and containing 2 ml. of ammonium salicylate.

It is readily apparent from the preceding examples that extraction of thorium as a thorium salicylate by an organic solvent is a suitable method for obtaining substantially thorium-free aqueous solutions of rare earths.

It is further apparent that the above extraction method provides a means for the purification of thorium on a scale requiring less accuracy and efficiency than the above-described procedure. The process of this invention wherein thorium is extracted by an organic solvent in the form of a thorium salicylate, separated and recovered from either the solvent phase or the aqueous extract phase resulting from back-extraction of thorium from the organic solvent extract phase is adaptable to continuous cyclic processes using continuous countercurrent systems, the number of cycles therein being dependent upon the degree of purification desired.

All of the specific compositions and processes disclosed in the present application, considered either singly or in combination, are included within the scope of the present invention which is to be construed as broadly as possible in view of the prior art and limited only by the scope of the appended claims.

What is claimed is:

1. A process for the separation of thorium from aqueous solutions containing salts of thorium and rare earths and sufficient acetate buffer to effect a pH of between 2 and 5, which comprises adding an ammonium salicylate to said aqueous buffered solution, contacting the resultant solution with a substantially water-immiscible organic solvent mixture of an ether and an ester and separating a solvent extract phase containing a thorium salicylate from the aqueous phase containing the rare earths.

2. The process of claim 1 wherein the organic solvent mixture is a mixture of ethyl acetate and ethyl ether.

3. A process for the separation of thorium from aqueous solutions containing salts of thorium and rare earths and sufficient acetate buffer to effect a pH of about 3, which comprises adding ammonium 2-hydroxybenzoate to said aqueous buffered solution, contacting the resultant solution with a substantially water-immiscible organic solvent mixture of an ether and an ester, separating a solvent extract phase containing thorium salicylate from the aqueous phase containing the rare earths, and recovering thorium values from said solvent extract phase.

4. A process for separating thorium from an aqueous solution containing a mixture of salts of thorium and rare earths, which comprises adding sufficient acetate buffer to said aqueous solution to effect a pH of at least 2, contacting said buffered aqueous solution with a salicylate and contacting with a substantially water-immiscible organic solvent, separating an aqueous phase and an organic solvent phase to effect the selective extraction of thorium salicylate, thereafter contacting said organic solvent phase containing a thorium salicylate wtih an aqueous solution of an inorganic acid having a pH of substantially less than 2, separating the organic solvent phase from the aqueous extract phase containing a thorium salt, and recovering thorium from the aqueous extract phase.

References Cited in the file of this patent

UNITED STATES PATENTS

| 1,933,520 | Bruson | Oct. 31, 1933 |
| 2,227,833 | Hixson et al. | Jan. 7, 1941 |

OTHER REFERENCES

Pratt et al.: "New Rare Earth Compounds," Journal of the American Chemical Society, vol. 33, p. 1332 (1911).

Gmelin-Kraut's Handbuch der anorganischen Chemie, Band VI, part 1, page 859 (1928).

Harvey et al.: "Journal of the Chemical Society," page 1021, August 1947.